Jan. 27, 1970 W. H. FRANKLAND 3,492,055

WHEEL AND BEARING ASSEMBLY

Filed Dec. 4, 1967

INVENTOR.
WILLIAM H. FRANKLAND

United States Patent Office 3,492,055
Patented Jan. 27, 1970

1

3,492,055
WHEEL AND BEARING ASSEMBLY
William H. Frankland, 108 N. Tampa St., Tampa, Fla. 33602
Filed Dec. 4, 1967, Ser. No. 687,773
Int. Cl. F16c 33/22, 35/06
U.S. Cl. 308—36.1 1 Claim

ABSTRACT OF THE DISCLOSURE

A wheel and bearing assembly having a stationary shaft and a journal sleeve inserted in an integrally molded wheel, the shaft having a cap at one end and a labyrinth seal at the opposite end to prevent the entry of foreign matter.

The present invention relates to wheel and bearing assemblies and more particularly to assemblies as are to support light-weight vehicles such as lawn mowers, lawn sweepers, carts and the like.

Such vehicles are for the most part used intermittently under dirty, dusty conditions, by home owners who often neglect the maintenance and lubrication, resulting in rapid bearing wear.

It is therefore, the principal object of this invention to provide a wheel and bearing assembly which does not require lubrication or maintenance, which is long-wearing and trouble free, which is simple and economical to manufacture and which advances the art generally.

In a broad aspect, the invention contemplates a wheel and bearing assembly comprising a wheel having a coaxially bearing sleeve which is journalled on the shank of a relatively stationary shaft to accommodate the radial forces imposed by the wheel. A head at one end of the shank engages one end of the bearing sleeve to oppose the axial forces in one direction. Opposite axial forces are opposed by the engagement of a thrust washer at the opposite end of the sleeve. The end of the shaft is preferably provided with threads which engage a nut to position the thrust washer and secure the shaft to the support of the vehicle. The head end of the shaft is sealed to prevent the entry of dirt and dust between the bearing surfaces by a cap secured to the hub of the wheel. The opposite end of the shaft is sealed by a simple labyrinth seal formed by interposing a ring of substantially the same diameter as the thrust washer between the washer and the adjacent surface of the wheel.

These and other objects and aspects of the invention will be apparent from the following specific example of the invention wherein.

Figure 1:
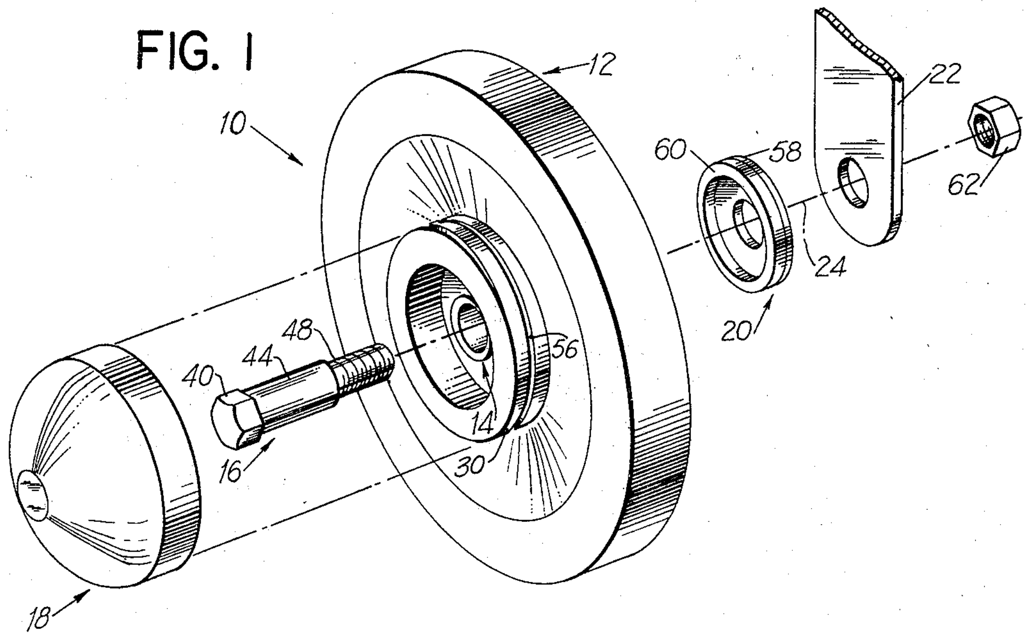
FIG. 1 is an exploded symmetric view of a wheel and bearing assembly.
Figure 2:
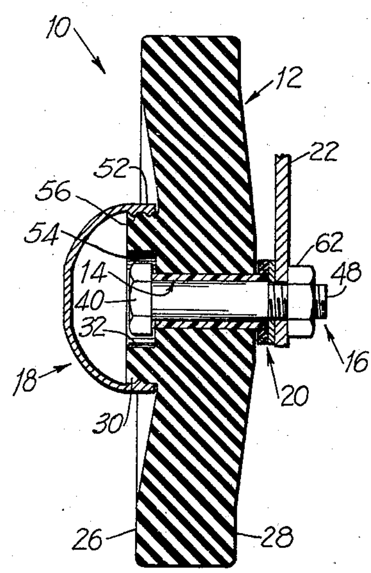
FIG. 2 is a sectional view through the central axis of the assembly.
Figure 3:
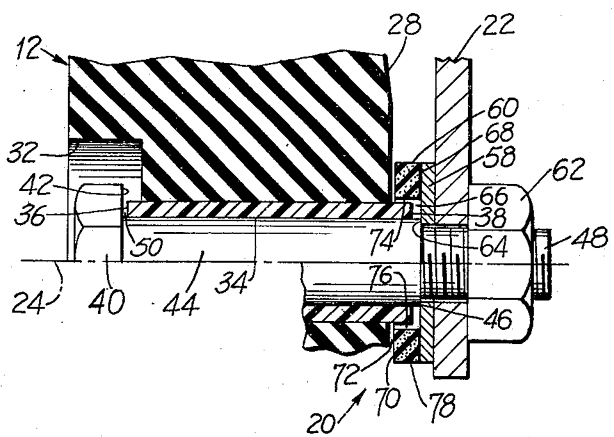
FIG. 3 is an enlarged fragmentary sectional view showing the details of the bearing and seals.

As can be seen in FIGS. 1 and 3, the wheel and bearing assembly 10 includes a vehicle wheel 12 having a central bearing sleeve 14 one end 38 of which extends slightly beyond the adjacent inner face 28 of the wheel. The opposite end 36 of the bearing sleeve 14 extends slightly beyond the bottom 54 of a recess 32 in a hub 30 on the outer face 26 of the wheel 12. Preferably, the wheel 12 and hub 30 are molded integrally of a suitable plastic with the bearing sleeve 14 as an insert coaxially arranged with respect to the common axis 24 of the wheel and hub. The bearing sleeve 14 is preferably of a material having a low coefficient of friction such as Nylon 66 (polyhexamethylene adepamide), Nylon 11, made from

2

11-aminoundecanoic acid, Nylon 6 (polycaprolactam) and the like, so that when journalled, as at 34 (FIG. 3), on the shank 44 of a shaft 16, the sleeve is able to rotate freely without lubrication under the radial load imposed by the wheel 12.

As is best illustrated in FIG. 1, the shaft 16 is preferably in the form of a bolt with a hex head 40 at one end and a threaded portion 48 at its other end. The dimension across opposed flats of the head 40 is greater than the diameter of the shank 44 to form a bearing surface 42 which engages the end 36 of the sleeve 14 to oppose the thrust of the wheel in an axial direction to the left as viewed in the drawings. Axial thrust is opposed by the face 64 of a thrust washer 58 of a seal assembly 20. The thrust washer 58 is secured between the end 46 of the shank 44 and the support 22 connecting the entire assembly 10 to a vehicle such as a lawn sweeper (not shown). As is shown in FIG. 1, the support 22 is provided with a circular aperture through which the treads 48 of the shaft 16 extend. The threads 48 are engaged by a nut 62 which when tightened, prevents relative movement between the shaft 16, the thrust washer 58 and the support 22. To prevent binding which would interfere with the rotation of the sleeve 14 and wheel 12 when the nut 62 is tightened, the shank 44 is made longer than the sleeve 14 so that clearance is provided at either 50 or 66 depending upon the direction of the axial thrust.

Because of the relatively soft nature of the material of the bearing sleeve 14, it is necessary that foreign matter such as dust, grit and dirt be kept out from between the journal surfaces 34 if satisfactory bearing life is to be realized, particularly when the assembly is used on lawn or garden apparatus. The seal 18 for the head end is formed by a cap 52 which engages threads 56 on the outer diameter of the wheel hub 30. The seal assembly 20 for the opposite end includes a ring 60 of a gasket material such as a cork or rubber compound which is cemented as at 68 to the adjacent face 64 of the thrust washer 58. The diameter of the aperture 74 of the seal ring 60 is only slightly greater than the outer diameter of the bearing sleeve 14 so that the running clearance 76 therebetween is minimized. The thickness 78 of the seal ring 60 is proportioned so that the clearance 72 between the wheel face 28 and the ring face 64 is also small.

It will be recognized that the above described construction results in an effective labyrinth seal which is simple and economical to manufacture and maintain. Foreign matter can reach the journal surface 34 only after transversing three small passages formed by the running clearances 72, 76 and 66. Further impedance to the foreign matter is offered by the right angle connections between the passages and the centrifugal forces imposed upon particles in clearance 72 by the rotation of wheel 28.

It should be understood that the present disclosure is for the purpose of illustration only. This invention includes all modifications that fall within the scope of the appended claim.

I claim:

1. A wheel bearing assembly comprising, a shaft, said shaft having a head at the outer end thereof, threads at the inner end thereof, and a smooth cylindrical shaped shank portion therebetween; a wheel, said wheel having a central hub portion formed thereon, and a cylindrical shaped bearing opening formed in said hub portion, and a cylindrical shaped nylon bearing sleeve fixed to said wheel in said bearing opening, said bearing sleeve being positioned on said shank portion for rotation with respect to said shaft, an apertured support for said shaft, the threaded end of said shaft being clamped to said support by a nut, a thrust washer on the threaded end of said shaft, said washer being clamped by said nut between said support and the shank portion of said shaft, said bearing sleeve having a length which is slightly greater than the length of said bearing opening and slightly less than the length of said sank portion whereby opposite ends of said bearing sleeve are exposed by a short distance which respect to opposite ends of said bearing opening and are spaced by a short distance from said head and thrust washer, and means sealing the opposite ends of said wheel bearing assembly against the entry of dirt thereto, said sealing means comprising a closure cap secured to said hub portion and covering the outer end of said bearing assembly, and an annular shaped seal ring at the inner end of said bearing assembly, said ring being attached to said washer and having a close overhanging relationship with respect to the exposed end of the bearing sleeve at the inner end of the bearing assembly to provide a labyrinth type seal at that end of the bearing assembly.

References Cited

UNITED STATES PATENTS

| | | | |
|---|---|---|---|
| 478,466 | 7/1892 | Richards | 308—36.1 |
| 574,418 | 1/1897 | Hartman | 308—16 |
| 621,741 | 3/1899 | Blackdurn | 308—16 |
| 762,081 | 6/1904 | McNulty | 308—16 |
| 1,795,069 | 3/1931 | Baker | 308—36.1 |
| 2,610,897 | 9/1952 | Rebmann | 301—5.7 |
| 2,614,895 | 10/1952 | Erwin | 308—36.1 |
| 2,871,647 | 2/1959 | Schrade. | |
| 3,003,834 | 10/1961 | Pendleton | 308—187.1 |
| 3,169,809 | 2/1965 | Pendleton | 308—187.1 |
| 3,207,291 | 9/1965 | Barnish | 308—20 X |

MARTIN P. SCHWADRON, Primary Examiner

LUCIUS L. JOHNSON, Assistant Examiner

U.S. Cl. X.R.

16—45; 308—238